(12) United States Patent
Debert et al.

(10) Patent No.: US 10,118,540 B2
(45) Date of Patent: Nov. 6, 2018

(54) STOP LIGHT FOR MOTOR VEHICLE REAR WINDOW ADAPTABLE TO A PLURALITY OF TYPES OF LIGHT SOURCES

(71) Applicant: Valeo Vision Belgique, Meslin l'Eveque (BE)

(72) Inventors: Florestan Debert, Nonain (FR); Dirkie Sacchet, Ecaussinnes (BE); Alexandre Franc, Lezennes (FR)

(73) Assignee: Valeo Vision Belgique, Meslin l'Eveque (BE)

( * ) Notice: Subject to any disclaimer, the term of this patent is extended or adjusted under 35 U.S.C. 154(b) by 0 days.

(21) Appl. No.: 15/175,277

(22) Filed: Jun. 7, 2016

(65) Prior Publication Data

US 2016/0362043 A1 Dec. 15, 2016

(30) Foreign Application Priority Data

Jun. 12, 2015 (FR) ...................... 15 55393

(51) Int. Cl.
| | | |
|---|---|---|
| H01R 12/00 | (2006.01) |
| B60Q 1/26 | (2006.01) |
| B60Q 1/44 | (2006.01) |
| F21V 19/00 | (2006.01) |
| F21S 43/19 | (2018.01) |
| F21S 43/14 | (2018.01) |
| F21S 43/27 | (2018.01) |
| F21S 43/20 | (2018.01) |
| F21Y 115/10 | (2016.01) |

(52) U.S. Cl.
CPC .............. *B60Q 1/268* (2013.01); *B60Q 1/44* (2013.01); *F21S 43/14* (2018.01); *F21S 43/19* (2018.01); *F21S 43/195* (2018.01); *F21S 43/26* (2018.01); *F21S 43/27* (2018.01); *F21V 19/003* (2013.01); *F21Y 2115/10* (2016.08)

(58) Field of Classification Search
CPC ......... B60Q 1/44; B60Q 1/268; F21S 48/211; F21S 48/212; F21S 48/215; F21S 48/2206; F21S 48/2212; F21V 19/003; F21V 19/0035
USPC ..................... 362/249.03, 249.04, 520, 646
See application file for complete search history.

(56) References Cited

U.S. PATENT DOCUMENTS

| 6,962,428 B2 | 11/2005 | Natsume |
| 2002/0034081 A1 | 3/2002 | Serizawa |
| 2004/0120160 A1 | 6/2004 | Natsume |

(Continued)

FOREIGN PATENT DOCUMENTS

| DE | 10145963 A1 | 4/2002 |
| DE | 102012107834 A1 | 2/2014 |

(Continued)

*Primary Examiner* — Evan Dzierzynski
*Assistant Examiner* — Keith G Delahoussaye
(74) *Attorney, Agent, or Firm* — Oblon, McClelland, Maier & Neustadt, L.L.P.

(57) ABSTRACT

A signaling and/or lighting device for a motor vehicle, notably a stop light for a rear window of a motor vehicle, including a printed circuit received by a support. The printed circuit includes at least one light source an emitting face of which is oriented toward an optical lens of the device, the emitting face being generally perpendicular to the optical axis of the lens. The printed circuit support makes it possible to receive the latter at a plurality of predetermined distances relative to the optical lens, thereby assuring the focusing of the light emitted by different types of light sources that can be used in the device.

17 Claims, 5 Drawing Sheets

(56) References Cited

U.S. PATENT DOCUMENTS

2006/0285348 A1  12/2006  Valcamp et al.
2011/0273892 A1  11/2011  Mostoller et al.

FOREIGN PATENT DOCUMENTS

JP  2004045192 A  2/2004
KR  20130032686 A  4/2013

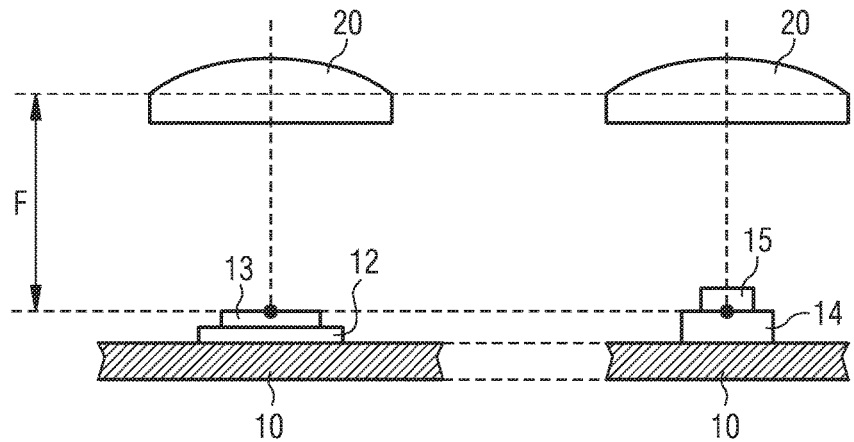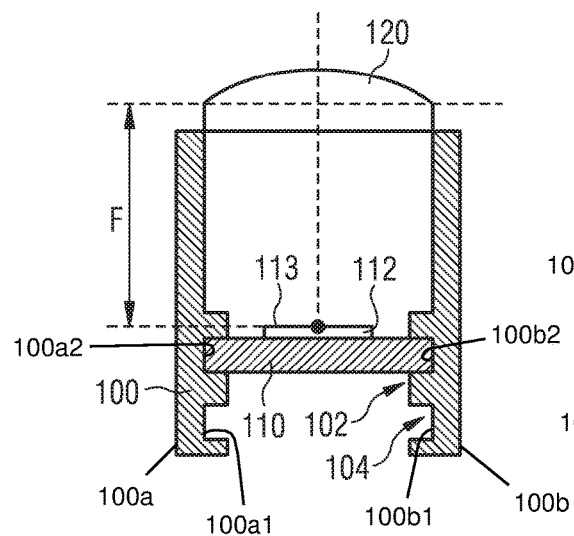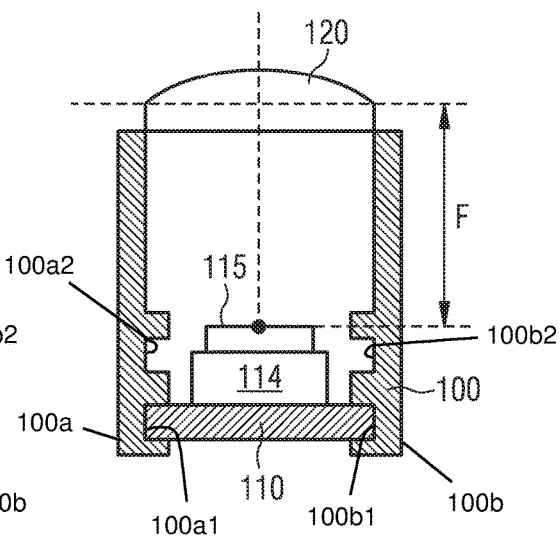

STOP LIGHT FOR MOTOR VEHICLE REAR WINDOW ADAPTABLE TO A PLURALITY OF TYPES OF LIGHT SOURCES

CROSS-REFERENCE TO RELATED APPLICATIONS

This application claims priority to the French application 1555393 filed Jun. 12, 2015, which application is incorporated herein by reference and made a part hereof.

BACKGROUND OF THE INVENTION

1. Field of the Invention

The invention relates to the field of signaling and/or lighting light-emitting devices for a motor vehicle. To be more precise, the invention relates to the field of the stop lights at the top of the rear window of a motor vehicle.

2. Description of the Related Art

For safety reasons, a motor vehicle is generally fitted with an additional stop light centrally positioned at the rear. When the driver of the motor vehicle applies the brakes, this light is therefore lit and attracts the attention of following road users. Being disposed at a raised position, for example in the upper part of a rear window, this stop light becomes visible by a queue of uses. As a result, more successive users are informed of the change of speed of the driver who is applying the brakes ahead of them. They are therefore better able to anticipate the dangers, and traffic conditions become safer.

To improve its visibility whilst preserving the useable volume of the passenger compartment of the motor vehicle, the stop light may be installed in known manner in the opening panel of the trunk when the latter means that the rear window can pivot. If the rear window is fixed, the stop light may be attached to the sealing of the passenger compartment. The stop light extends vertically downward from its support. It shines through the rear window of the vehicle that receives it, whilst remaining discreet in the passenger compartment.

For a given motor vehicle type or model, it is known to develop a type of stop light in a rear central position. Such a device generally includes one or more optical lenses associated with one or more light sources, for example of light-emitting diode (LED) type. The electronic circuit including the light sources is generally supported by a printed circuit mounted at a predetermined location in the device. It is in fact not desirable to provide a plurality of devices for different configurations of the same vehicle model, notably for reasons of production efficiency and associated development costs.

For reasons of the regulations, notably where the intensity of the perceived flux of the stop lights is concerned, it is often necessary to use LEDs of different types and of different power on the same vehicle model, as a function of the configuration of the vehicle. In fact, while the opacity of the glass of the rear window has an influence on the transmission of light from the stop light, the same applies to the radius of curvature and the inclination of the glass.

However, if different types of LEDs are used in the same embodiment of the stop light, there results a loss of efficiency. The device, and notably the optical lens, is generally adapted to suit a given type of LED or light source. The use of a different type of source for which the position of the optical lens has not been optimized beforehand generally generates sub-optimum behavior of the device.

SUMMARY OF THE INVENTION

An object of the invention is to alleviate at least one of the problems raised by the prior art.

The invention consists in a signaling and/or lighting device for a motor vehicle. The device includes a printed circuit received by a support, the printed circuit including at least one light source. An emitting face of the light source is oriented toward an optical lens of the device. The emitting face is generally perpendicular to the optical axis of the lens. The device is notable in that the support makes it possible to receive the printed circuit at two distinct predetermined distances at least relative to the optical lens.

At least one of the predetermined distances defined by the support is preferably such that the emitting face of the light source is situated at the focal distance of the optical lens when the printed circuit is received at that distance.

The support may preferably include first support means and second support means respectively intended to receive the printed circuit at a first distance and at a second distance greater than the first distance relative to the optical lens.

The first and second support means may preferably be configured to cooperate with the edge of the printed circuit.

The support means may preferably extend generally parallel to the optical axis of the lens and may be configured so as to cooperate with corresponding notches on the printed circuit.

The printed circuit may preferably include openings or holes corresponding to the location of the second support means and enabling the latter to pass through the printed circuit.

The printed circuit may preferably include at least one light source of a first type on a first face and/or at least one light source of a second type on an opposite second face. The height of the emitting face of a light source of the second type relative to the plane defined by the printed circuit being greater than the corresponding height of the emitting face of a light source of the first type.

The first distance predetermined by the support may preferably be such that the emitting face of the light source of the first type is situated at the focal distance of the optical lens when the printed circuit is received at the first distance, the first face being oriented toward the lens. Similarly, a second distance predetermined by the support may preferably be greater than the first distance such that the emitting face of the light source of the second type is situated at the focal distance of the optical lens when the printed circuit is received at the second distance, the second face being oriented toward the lens.

The first face of the printed circuit may preferably include notches or openings intended to cooperate with the first support means. Moreover, the second face of the printed circuit may preferably include notches or openings intended to cooperate with the second support means.

The arrangement of the support means and the notches or openings of the printed circuit may preferably be such that when the printed circuit is received at the first distance, the first face being oriented toward the lens, the second support means pass through the printed circuit.

The light sources of the first type may preferably be intended to emit a different luminous flux than the light sources of the second type.

The optical lens and the support may V be made in one piece.

The light sources may preferably include a semiconductor element, notably a light-emitting diode (LED).

The device in accordance with the invention may advantageously be a stop light for a motor vehicle rear window.

Using the measures in accordance with the invention, it becomes possible to construct a type of stop light in a rear central position having optimum optical properties for a plurality of types of light sources using the same optical lens. The optical lens or lenses of the device defines or define a fixed focal distance of the device. When a light source is situated at the focal distance relative to the lens, the optical properties of the device are the optimum. As source types, notably LED types that are different are electronic components having different heights, the invention provides a support making it possible to mount different types of LEDs by way of their printed circuit at different predetermined distances relative to the optical lens. The distances are advantageously chosen such that each distance corresponds to one type of LED intended to be used in the light. This means that the mounting of a given type of LED at the predetermined distance associated therewith has the direct consequence that the emitting face of the LED is at the focal distance of the optical lens.

The support defining the predetermined distances is advantageously in one piece with the optical lens, which ensures that the distances are invariable during the assembly of the device, since no alignment of other components relative to the lens is necessary.

First support means of the device are adapted to hold a printed circuit at a first distance and second support means are adapted to hold a printed circuit at a second distance. The same printed circuit may advantageously have on each of its two faces means that respectively cooperate with the first and second support means of the device. The same printed circuit can therefore be mounted at two of the distances predetermined by the device. One or both faces of the printed circuit can then be populated with LEDs the height of which is such that their emitting face is located at the focal distance relative to the optical lens. In this way, the same printed circuit can be used to place two different types of LEDs at respective optimum and predetermined positions relative to the optical lens. This is achieved without generating additional development costs and notably without necessitating changing of other components of the stop light, such as the optical lens, for example.

These and other objects and advantages of the invention will be apparent from the following description, the accompanying drawings and the appended claims.

BRIEF DESCRIPTION OF THE ACCOMPANYING DRAWINGS

Other features and advantages of the present invention will be better understood with the assistance of the description of examples and the drawings, in which:

FIGS. 1A and 1B represent a diagrammatic view of a lateral section of a known prior art device in two configurations;

FIG. 2 represents a diagrammatic view of a lateral section of a device in accordance with one embodiment of the invention in a first configuration;

FIG. 3 represents a diagrammatic view of a lateral section of the device shown in FIG. 2 in a second configuration;

DETAILED DESCRIPTION OF THE PREFERRED EMBODIMENTS

Figure 4A:
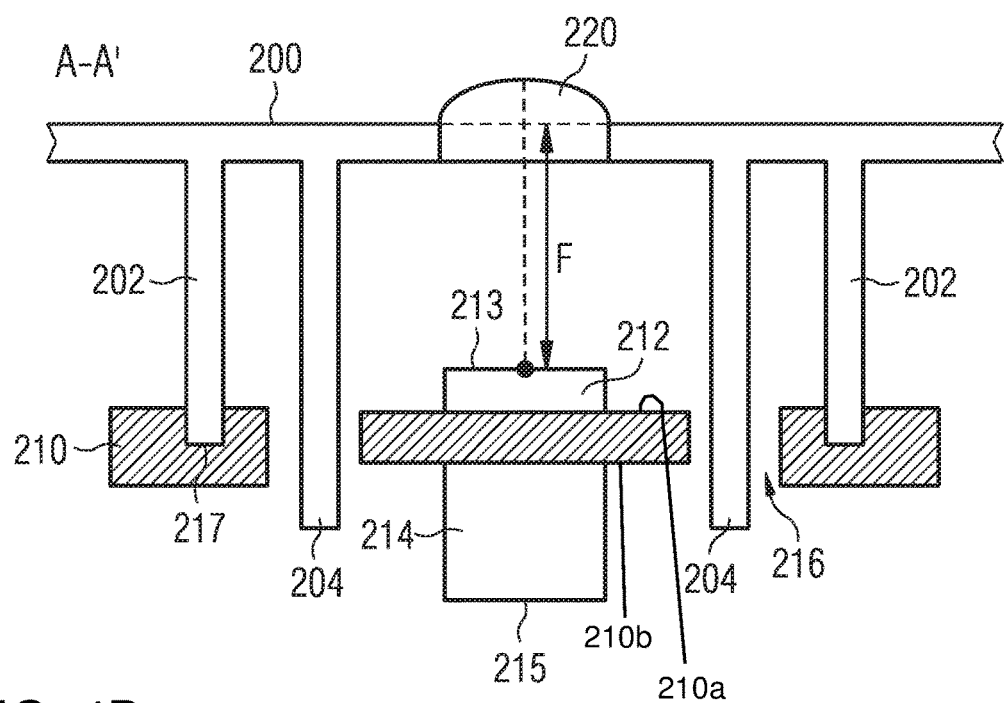
FIG. 4A represents a diagrammatic view of a lateral section of a device in accordance with one embodiment of the invention in a first configuration.

In the following description, similar reference numbers will be used for similar concepts via different embodiments of the invention. Thus the numbers 100, 200, 300, 400 describe a support in three different embodiments of the invention.

Unless otherwise specifically indicated, technical features described in detail for a given embodiment may be combined with the technical features described in the context of other embodiments described by way of nonlimiting example.

FIGS. 1A and 1B show two configurations of a known prior art device. The FIG. 1A device includes an optical lens 20 and a support that is not shown intended to receive a printed circuit 10 supporting a light source 12. The light source 12 is a light-emitting diode (LED), for example, in the form of an electronic microchip, having a light-emitting face 13. The support is used to hold the printed circuit 10 at a predetermined distance which is such that the light-emitting face 13 of the light source 12 is situated at a distance F from the lens 20 corresponding to the focal distance of the latter. Moreover, the support holds the printed circuit 10 and the light source 12 in a plane generally perpendicular to the optical axis of the lens 20. In the FIG. 1B configuration, the same device is used with a different type of LED 14 mounted on the printed circuit 10. The LED 14 is characterized by a greater height relative to the plane of the printed circuit 10 compared to the LED 12. Consequently, the emitting face 15 is closer to the lens 20 and is not situated at the focal distance F of the latter. Such devices are commonly used in the prior art, even though they necessarily generate degraded lighting performance in the case of FIG. 1B.

FIG. 2 shows a diagrammatic illustration of a lighting device in accordance with one embodiment of the invention. The device includes a printed circuit 110 that is received by a support 100. The support 100 is disposed so as to receive the printed circuit 110 in a manner that is generally perpendicular to the optical axis of the optical lens 120 and at two distinct distances relative to the position of the lens 120. The printed circuit 110 includes on the face that is oriented toward the lens 120 a light source 112 that is a light-emitting diode (LED), for example, having an emitting surface 113. The arrangement is such that the emitting surface 113 is generally perpendicular to the optical axis and the LED 112 emits light rays in the direction of the lens 120 when it is energized. The printed circuit 110 may notably include other electronic components, for example implementing means for controlling the supply of power to the light source 112 shown. Alternatively, such means may be offset relative to the printed circuit 110 and connected thereto by an electrical connection. In known manner control means of the supply of power to the light source 112 make it possible to convert a current of a given intensity, supplied for example by a battery of the motor vehicle equipped with the device, into a charging current of different intensity adapted to power the light source 112. Such means are well known in the art and their operation will not be described in more detail in the context of the present invention.

Although in the example shown the printed circuit 110 includes only one light source 112 associated with one optical lens 120, it is obvious that the printed circuit 110 may include a plurality of such light sources 112 each associated with the optical lens 120.

The lens 120 defines a focal distance F. The distances predetermined by the support 100 are such that there is at least one mounting distance to receive therein the printed circuit 110 carrying the light source 112 in such a way that the emitting surface 113 of the light source 112 is situated at the focal distance F relative to the optical lens 120. In the embodiment shown, the support 100 includes arms 100a, 100b that extend generally parallel to the optical axis of the lens 120 on two opposite sides of the latter. The two arms 100a, 100b include notches 100a1, 100a2, 100b1 and 100b2 arranged symmetrically. A notch of one arm is situated in the same plane perpendicular to the optical axis of the lens 120 as the corresponding notch of the other arm. The notches 100a1, 100a2 of one arm 100a are oriented towards the notches 100b1, 100b2 of the other arm 100b. These notches 100a1, 100a2, 100b1 and 100b2 make it possible to support the edges of the printed circuit 110 as shown. The location of the notches 100a1, 100a2, 100b1 and 100b2 is chosen as a function of the type of LED 112 to be used in the device, each type of LED 112 potentially having a different height on the printed circuit. LEDs 112 known in the prior art have heights on the circuit from 0.6 mm to 1.8 mm, for example. In the FIG. 2 example, the notches or support means 102, 104 define two distances at which the printed circuit 110 is mounted relative to the lens 120. The first distance is suited to the use of an LED 112 of a first type. As shown in FIG. 3, the second distance is suited to the use of an LED 114 of a second type of greater height on the printed circuit 110. The support 100 enables optimum mounting of the two types of LED 112, 114 that results in the placement of the respective emitting surfaces 113, 115 at the level of the focal distance F of the lens 120, therefore optimizing the optical properties of the device. It is clear that the example shown may be scaled without departing from the scope of the invention, for example by providing three or more predetermined distances.

FIGS. 4A-5B show a device in accordance with another embodiment of the invention. FIGS. 4A and 4B show a first configuration of this device. A printed circuit 210 populated on both its faces 210a, 210b with light-emitting diodes 212, 214, respectively, of two different types is shown. It is generally sufficient for one or the other of the faces 210a, 210b of the printed circuit 210 to be populated with light-emitting diodes of the same type as the diodes 212 or 214, respectively. The printed circuit 210 has the particular feature that is adapted to cooperate with the first support means 202 of the support 200 when the face 210a carrying the diode 212 is oriented toward the lens 220 and is adapted to cooperate with the second support means 204 when the opposite face 210b carrying the diode 214 is oriented toward the lens 220.

Figure 5A:
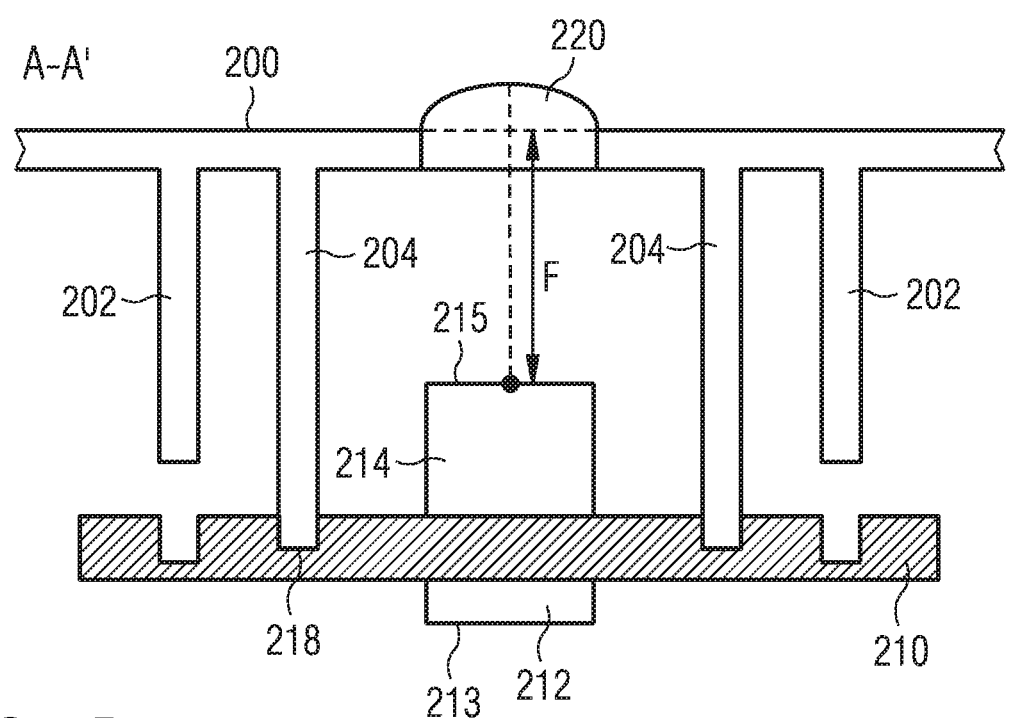
FIG. 5A represents a diagrammatic view of a lateral section of the device shown in FIG. 4A in a second configuration.

The distance predetermined by the first support means 202 is such that, when the printed circuit 210 is received by those first support means 202, the emitting surface 213 of the diode 212 is situated at the focal distance F relative to the lens 220. This is shown in FIG. 4A. The distance predetermined by the second support means 204 is such that, when the printed circuit 210 is received by those second support means 204, the emitting surface 215 of the diode 214 is situated at the focal distance F relative to the lens 220. This is shown in FIG. 5A. Obviously the orientation of the printed circuit 210 is different in these two cases, orienting either one or the other of its two faces toward the lens 220.

Figure 4B:
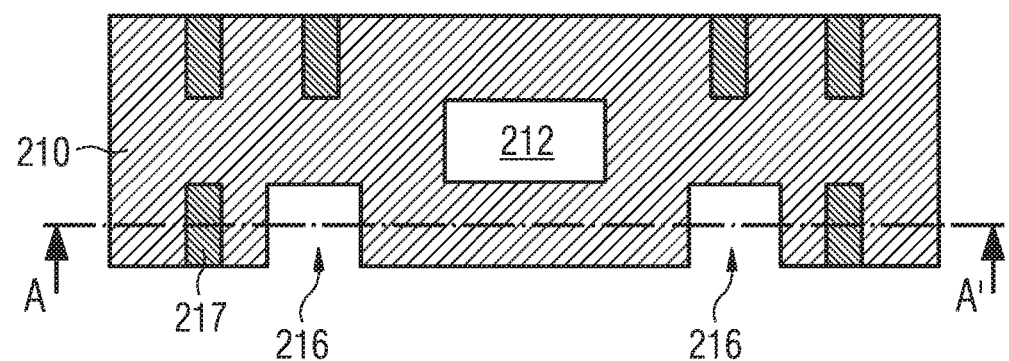
FIG. 4B represents a detail of the configuration shown in FIG. 4A in plan view.

The first and second support means 202, 204 extend in pairs in the form of arms or ribs on either side of the lens 220, generally parallel to the optical axis of the latter. The first support means 202 extend a shorter distance than the second support means 204, therefore defining a first distance less than a second distance. The printed circuit 210 includes on its first face carrying the first type of light source 212 notches 217 placed so as to cooperate with the end pieces of the first support means 202. The printed circuit 210 further includes holes, notches or vias 216 allowing the second support means 204 to pass through the printed circuit 210 when the printed circuit 210 is received at the first distance. This is shown in FIGS. 4A and 4B.

Figure 5B:
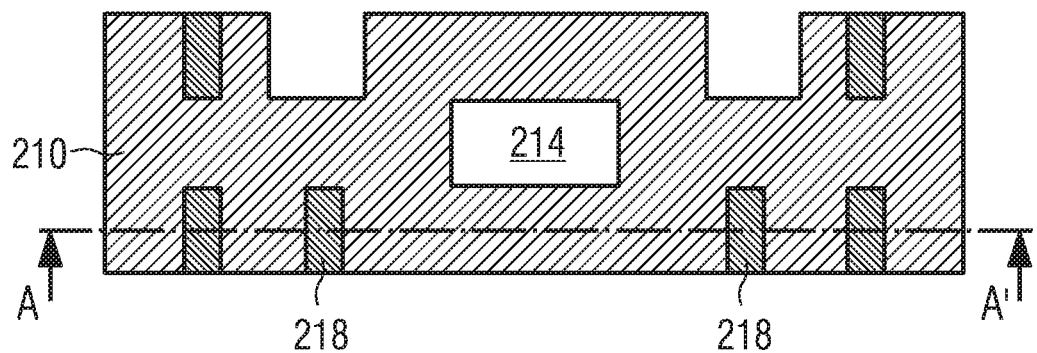
FIG. 5B represents a detail of the configuration shown in FIG. 5A in plan view.

The arrangement of the notches or holes 216 is such that, if the printed circuit 210 is turned over in order to orient the light source 214 toward the lens 220, the second support means 204 are not able to pass through the printed circuit 210. In fact, notches 218 (FIG. 5A) intended to cooperate with the end parts of the second support means 204 are provided on the second face of the printed circuit 210. This is shown in FIGS. 5A and 5B. One possible implementation is shown in FIGS. 4A-5B. It goes without saying that, depending on the geometry of the first and second support means 202, 204, notches or holes are to be provided at locations other than those shown in order to guarantee the operation as described. Such modifications will nevertheless be obvious to the person skilled in the art and remain within the scope of the present invention.

As shown, the support 200 including the first and second support means 202, 204 is preferably in one piece with the optical lens 220. The lens 220 may be made of glass, for example, other suitable materials being known to the person skilled in the art. By integrating the support directly into the lens 220, the predetermined distances relative to the lens 220 can no longer be degraded in error, even when assembling the device.

Figure 6:
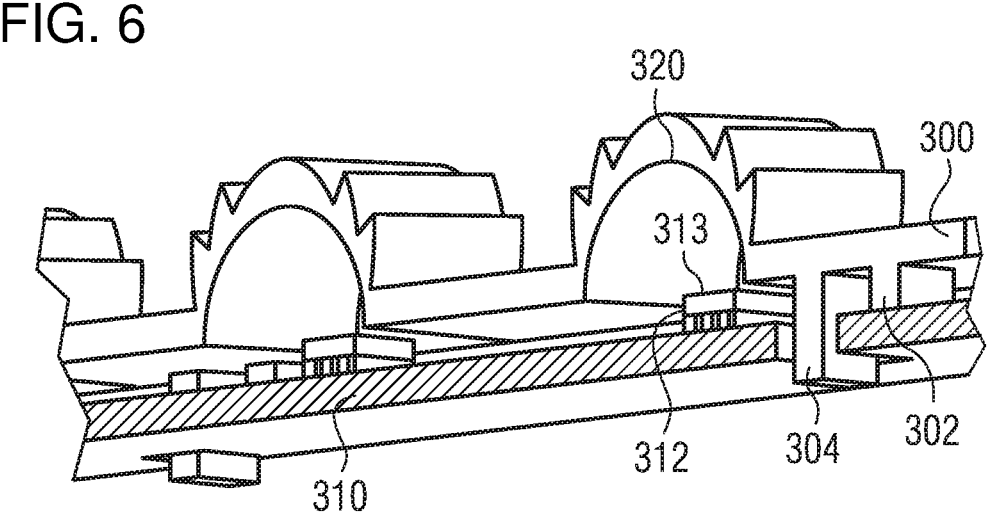
FIG. 6 represents a diagrammatic perspective view of a device in accordance with one embodiment of the invention in a first configuration.

FIG. 6 shows the device in accordance with another embodiment of the invention in a first configuration. The principle is identical to that which has just been described for FIGS. 4A-5B. A printed circuit 310 is supported in a first orientation relative to a lens 320. In this orientation, a first face of the printed circuit 310 including a first type of LED 312 is oriented toward the lens 320. The distance between the emitting face 313 of the LED and the lens 320 is predetermined by first support means 302. The printed circuit 310 further includes holes disposed in such a way as to allow the passage of second support means 304 when the first face of the printed circuit 310 is oriented toward the lens 320.

Figure 7:
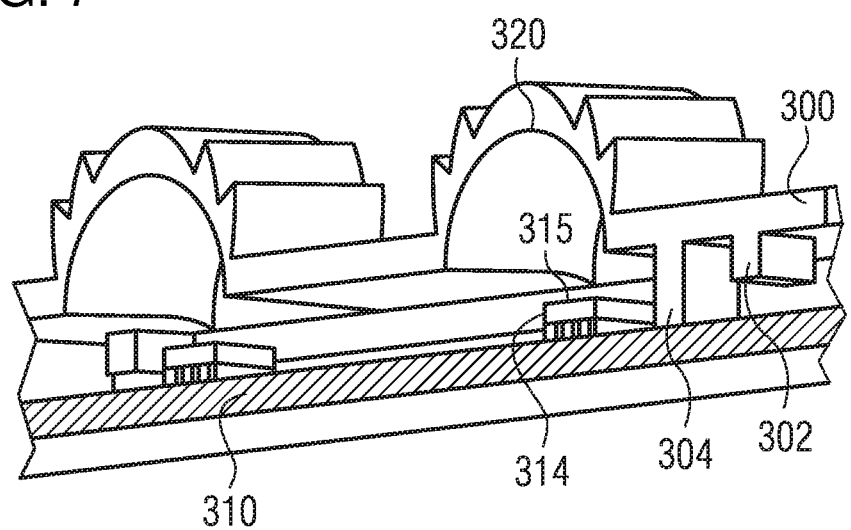
FIG. 7 represents a diagrammatic perspective view of the device shown in FIG. 6 in a second configuration.

FIG. 7 shows the FIG. 6 device again in another configuration. The printed circuit 310 has been overturned relative to the FIG. 6 configuration. The second face, opposite the first face, is therefore oriented toward the lens 320. In this orientation, the second support means 304 do not pass through the printed circuit 310 but define the distance between the emitting face 315 of the second type of diode 314 mounted on the second face of the printed circuit 310. The distances predetermined by the first and second support means 302, 304 are such that the emitting faces 313, 315 of the first and second types of LEDs 312, 314 can be situated at the fixed focal distance of the lens 320.

Figure 8:
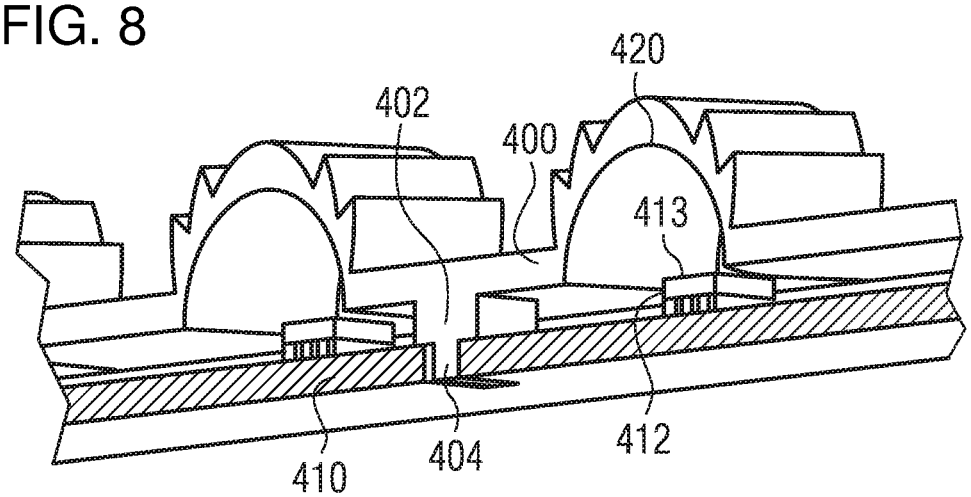
FIG. 8 represents a diagrammatic perspective view of a device in accordance with one embodiment of the invention in a first configuration.

FIG. 8 shows the device in accordance with another embodiment of the invention in a first configuration. A printed circuit 410 is supported in a first orientation relative to a lens 420. In this orientation, a first face of the printed circuit 410 including a first type of LED 412 is oriented toward the lens 420. The distance between the emitting face 413 of the LED 412 and the lens 420 is predetermined by first support means 402. In this example, the first and second support means 402, 404 are in one piece. The printed circuit 410 includes holes arranged so as to allow the passage of the second support means 404 when the first face of the printed circuit 410 is oriented toward the lens 420. The first support means 402, which are wider than the second support means 404, come to bear on the contour of the holes.

Figure 9:
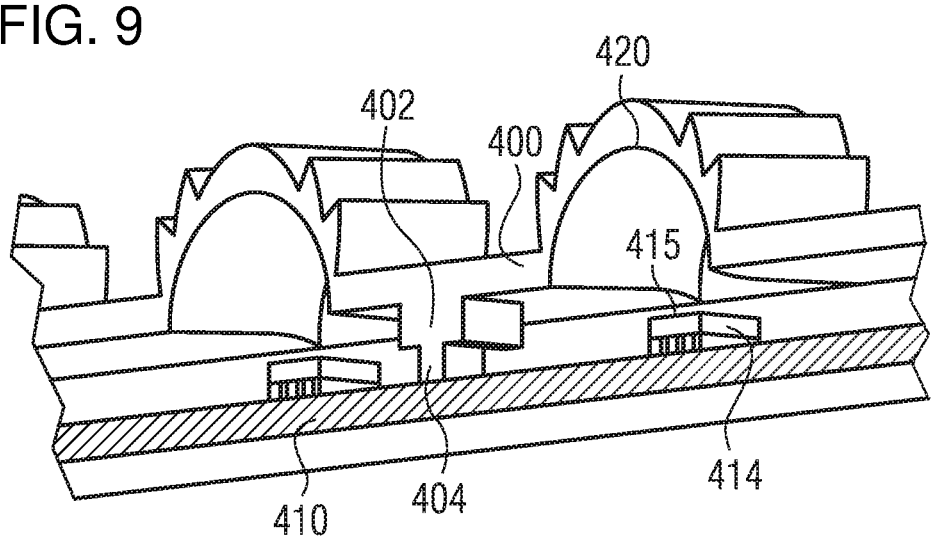
FIG. 9 represents a diagrammatic perspective view of the device shown in FIG. 8 in a second configuration.

FIG. 9 shows the FIG. 8 device again in a second configuration. The printed circuit 410 is turned over relative to the FIG. 8 configuration. The second face, opposite the first face, is therefore oriented toward the lens 420. In this orientation, the second support means 404 do not pass through the printed circuit 410 but define the distance between the emitting face 415 of the second type of diode 414 mounted on the second face of the printed circuit 410. The distances predetermined by the first and second support means 402, 404 are such that the emitting faces 413, 415 of the first and second types of LEDs 412, 414 may be situated at the fixed focal distance of the lens 420.

While other uses of the device may be envisaged, the device is preferably a stop light for a motor vehicle rear window.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A lighting device for a motor vehicle, including a printed circuit received by a support, said printed circuit including at least one light source; an emitting face of which is oriented toward an optical lens of the device, said emitting face being generally perpendicular to an optical axis of said optical lens,
    wherein said support is configured to receive said printed circuit at two distinct predetermined distances at least relative to said optical lens, and
    wherein said printed circuit includes said at least one light source of a first type on a first face and said at least one light source of a second type on an opposite second face, a height of said emitting face of said at least one light source of said second type relative to a plane defined by said printed circuit being greater than a corresponding height of said emitting face of said at least one light source of said first type.

2. The lighting device as claimed in claim 1, wherein at least one of said two distinct predetermined distances defined by said support is such that said emitting face of said at least one light source is situated at a focal distance of said optical lens when said printed circuit is received at said focal distance.

3. The lighting device as claimed in claim 1, wherein said printed circuit includes at least one of said at least one light source of a first type on a first face and said at least one light source of a second type on an opposite second face, a height of said emitting face of said at least one light source of said second type relative to a plane defined by said printed circuit being greater than a corresponding height of said emitting face of said at least one light source of said first type.

4. The lighting device as claimed in claim 3, wherein said at least one light sources of said first type are configured to emit a different luminous flux than said at least one light sources of said second type.

5. The lighting device as claimed in claim 1, wherein a first distance predetermined by said support is such that said emitting face of said at least one light source of said first type is situated at a focal distance of said optical lens when said printed circuit is received at said first distance, said first face being oriented toward said optical lens,
    and in that a second distance greater than said first distance predetermined by said support is such said the emitting face of said at least one light source of said second type is situated at a focal distance of said optical lens when said printed circuit is received at said second distance, said second face being oriented toward said optical lens.

6. The lighting device as claimed in claim 1, wherein said first face of said printed circuit includes notches or openings configured to cooperate with said first support means,
    and in that said second face of said printed circuit includes notches or openings configured to cooperate with said second support means.

7. The lighting device as claimed in claim 6, wherein an arrangement of said first and second support means and said notches or openings of said printed circuit is such that when said printed circuit is received at said first distance, said first face being oriented toward said optical lens, said second support means pass through said printed circuit.

8. The lighting device as claimed in claim 1, wherein said optical lens and said support are made in one piece.

9. The lighting device as claimed in claim 1, wherein said at least one light sources include a semiconductor element, specifically a light-emitting diode (LED).

10. The lighting device as claimed in claim 1, wherein said device is a stop light for a rear window of a motor vehicle.

11. A lighting device for a motor vehicle, including a printed circuit received by a support, said printed circuit including at least one light source; an emitting face of which is oriented toward an optical lens of the device, said emitting face being generally perpendicular to an optical axis of said optical lens,
    wherein said support is configured to receive said printed circuit at two distinct predetermined distances at least relative to said optical lens, wherein said support includes first support means and second support means respectively for receiving said printed circuit at a first distance and at a second distance greater than said first distance relative to said optical lens.

12. The lighting device as claimed in claim 11, wherein said first support means and said second support means extend generally parallel to said optical axis of said optical lens and are configured so as to cooperate with corresponding notches on said printed circuit.

13. The lighting device as claimed in claim 12, wherein said printed circuit includes openings or holes corresponding to a location of said second support means and enabling said second support means to pass through said printed circuit.

14. A lighting device for a motor vehicle, including a printed circuit received by a support, said printed circuit including at least one light source; an emitting face of which is oriented toward an optical lens of the device, said emitting face being generally perpendicular to an optical axis of said optical lens,
- wherein said support is configured to receive said printed circuit at a plurality of predetermined distances relative to said optical lens, and
- wherein said support includes a first support and a second support each integrally formed with said support and configured to receive said printed circuit at a first distance and at a second distance, respectively, said second distance being greater than said first distance relative to said optical lens.

15. The lighting device as claimed in claim 14, wherein at least one of said plurality of predetermined distances defined by said support is such that said emitting face of said at least one light source is situated at a focal distance of said optical lens when said printed circuit is received on said support.

16. The lighting device as claimed in claim 14, wherein said first support and said second support extend generally parallel to said optical axis of said optical lens and are configured so as to cooperate with corresponding notches on said printed circuit.

17. The lighting device as claimed in claim 16, wherein said printed circuit includes openings or holes corresponding to a location of said second support and enabling said second support to pass through said printed circuit.

* * * * *